United States Patent
Seo

(10) Patent No.: US 6,212,388 B1
(45) Date of Patent: Apr. 3, 2001

(54) METHOD AND SYSTEM FOR INCREASING FREQUENCY ASSIGNMENT IN A MOBIL TELECOMMUNICATION SYSTEM

(75) Inventor: Seong-ju Seo, Seoul (KR)

(73) Assignee: Samsung Electronics Co., Ltd., Kyungki-Do (KR)

(*) Notice: Subject to any disclaimer, the term of this patent is extended or adjusted under 35 U.S.C. 154(b) by 0 days.

(21) Appl. No.: 09/330,880

(22) Filed: Jun. 11, 1999

(30) Foreign Application Priority Data

Jun. 15, 1998 (KR) .............................................. 1998-22289

(51) Int. Cl.[7] ........................................................ H04Q 7/20
(52) U.S. Cl. ........................ 455/450; 455/452; 370/329
(58) Field of Search .................................... 455/450, 452, 455/62, 509, 513, 514, 422, 447; 370/329, 330, 331, 332

(56) References Cited

U.S. PATENT DOCUMENTS

| | | | |
|---|---|---|---|
| 5,280,630 | * | 1/1994 | Wang ........................................ 455/62 |
| 5,551,064 | * | 8/1996 | Nobbe et al. ............................ 455/62 |
| 5,649,292 | * | 7/1997 | Doner ..................................... 455/447 |
| 5,666,654 | * | 9/1997 | Kanai ...................................... 455/62 |
| 5,805,633 | * | 9/1998 | Uddenfeldt ............................. 370/330 |
| 5,963,865 | * | 10/1999 | Desgagne et al. ..................... 455/509 |
| 6,032,046 | * | 2/2000 | Nakano .................................. 455/450 |
| 6,052,594 | * | 4/2000 | Chuang et al. ........................ 455/450 |

* cited by examiner

*Primary Examiner*—Nay Maung
*Assistant Examiner*—Quochien Vuong
(74) *Attorney, Agent, or Firm*—Steve Cha; Klauber & Jackson

(57) ABSTRACT

A method for adding frequency assignment in a mobile telecommunication system is disclosed. The method according to the present invention includes a step of getting a mobile station to receive the communication services through the presently serviceable FAs in such a way that the BTS transmits the channel list including the information of the presently serviceable FAs to the mobile station; a step of adding a new FA by the BTS; a step of generating a first channel list having only information for the added FA; a step of optimizing the new FA by getting the operating mobile station to be provided with the communication services through only the new FA; a step of generating a second channel list including the information of all FAs, which are presently serviceable by the BTS and the new FA after completion of the optimization of the new FA; and, a step of getting the mobile station to be provided with the communication services through all the FAs to the mobile station based on the second channel list.

15 Claims, 8 Drawing Sheets

| | 1FA | 2FA | 3FA | 4FA | 5FA | 6FA | 7FA |
|---|---|---|---|---|---|---|---|
| α SECTOR | [100] | [200] | [ 0 ] | [ 0 ] | [ 0 ] | [ 0 ] | [ 0 ] |
| β SECTOR | [100] | [200] | [ 0 ] | [ 0 ] | [ 0 ] | [ 0 ] | [ 0 ] |
| γ SECTOR | [100] | [200] | [ 0 ] | [ 0 ] | [ 0 ] | [ 0 ] | [ 0 ] |

|  | 1FA | 2FA | 3FA | 4FA | 5FA | 6FA | 7FA |
|---|---|---|---|---|---|---|---|
| α SECTOR | [100] | [200] | [ 0 ] | [ 0 ] | [ 0 ] | [ 0 ] | [ 0 ] |
| β SECTOR | [100] | [200] | [ 0 ] | [ 0 ] | [ 0 ] | [ 0 ] | [ 0 ] |
| γ SECTOR | [100] | [200] | [ 0 ] | [ 0 ] | [ 0 ] | [ 0 ] | [ 0 ] |

FIG. 9A

|  | 1FA | 2FA | 3FA | 4FA | 5FA | 6FA | 7FA |
|---|---|---|---|---|---|---|---|
| α SECTOR | [300] | [ 0 ] | [ 0 ] | [ 0 ] | [ 0 ] | [ 0 ] | [ 0 ] |
| β SECTOR | [300] | [ 0 ] | [ 0 ] | [ 0 ] | [ 0 ] | [ 0 ] | [ 0 ] |
| γ SECTOR | [300] | [ 0 ] | [ 0 ] | [ 0 ] | [ 0 ] | [ 0 ] | [ 0 ] |

FIG. 9B

METHOD AND SYSTEM FOR INCREASING FREQUENCY ASSIGNMENT IN A MOBIL TELECOMMUNICATION SYSTEM

CLAIM OF PRIORITY

This application makes reference to, incorporates the same herein, and claims all benefits accruing under 35 U.S.C. §119 arising from an application entitled, METHOD AND SYSTEM FOR INCREASING FREQUENCY ASSIGNMENT IN A MOBILE TELECOMMUNICATION SYSTEM, earlier filed in the Korean Industrial Property Office on Jun. 15, 1998, and there duly assigned Ser. No. 1998-22289.

FIELD OF THE INVENTION

The present invention relates to a mobile telecommunication system using a radio frequency channel to provide communication services to a plurality of subscribers. More particularly, the present invention relates to method and system for increasing frequency assignment for multiple communication units by incorporating verification and optimization process, wherein a channel list for the newly added frequency assignment (FA) is distinguished from another channel list for the previously existing frequency assignments (FAs).

DESCRIPTION OF THE RELATED ART

FIG. 1 illustrates a conventional CDMA mobile telecommunication system, and includes a plurality of base transceiver stations (BTSs) 30, 31 for providing a subscriber with communication service through a mobile station (MS) 40, 41, a plurality of base station controllers (BSCs) 20, 21 for controlling the plurality of BTSs 30, 31, and a mobile switching center (MSC) 10 for connecting the plurality of BSCs 20, 21 to a public switched telephone network (PSTN) 11.

A cellular mobile telecommunication system makes it possible for more subscribers to communicate with each other by improving the efficiency in the amount of traffic capacity that can be carried in allocated radio spectrum bands. As a demand for cellular service grows, operator of such system attempts to make maximum effective use of the available radio frequency bandwidth in order to accommodate the service demand. A cell division technology is widely used to improve the efficiency in frequency reuse. One of the known cell division technologies is a sectorization. In such a method, a cell is generally divided into three equal parts by spacing three 120 degrees antennas, each sector has only seven channels to achieve optimal traffic capacity while maintaining acceptable signal quality.

Typically, each sector cell operates on either a primary frequency or a secondary frequency, and a mobile station is initially set up to detect for either the primary or secondary frequency, and these frequencies are shared by all the BTS. Each FA has its own codes, different from each other, serving to provide various traffic channels. Thus, as the number of subscribers grow, the BTS (or sector) accommodates more subscribers by incorporating frequency assignment process which attempts to avoid assigning the same frequency to the mobile station.

FIG. 2 represents an illustration of a plurality of frequency assignments (FAs) to which the BTS supports. As illustrated in FIG. 2, each sector (α, β, and γ sector) can support up to maximum of seven FAs. The BTS stores a status report for each of the seven FAs and their frequency values in a program loaded data (PLD), which represents the data relating to system configuration information that is necessary for managing the mobile telecommunication system. If the number of subscribers is added, the BTS provides the mobile station with allocating new frequency assignments that are available for use in accordance with the PLD.

A mobile station within a cell communicates with a BTS via radio channel. A channel being established from the BTS to the mobile station is called a forward channel, and a channel being established from the mobile station to the BTS is called a reverse channel. The mobile station and BTS receive/transmit the voice information and data information with each other through a traffic channel. The forward channel consists of pilot channel, synchronous channel, paging channel and access channel, which are located in the overhead channel.

In the CDMA cellular system, the mobile station and BTS first receive/transmit data from each other via the overhead channel, prior to establishing the communication link. The paging channel transmits system information, and other numerous messages in order to establish a call-setup to the mobile station, which operates within the coverage area of the BTS. The BTS transmits all the system configuration and timing information to the mobile station. Based on this information, the mobile station selects a specific frequency to establish a communication link and to maintain the call. The system configuration information relating to FAs is called channel list message (CDMA_CH_LIST), which contains information to determine whether the communication channel is active within that cell. Further, the channel list message can be transmitted periodically, or instantaneously transmitted whenever a new FA is added or deleted.

The process of generating the channel list by the BTS is described as follow: The BTS generates the channel list, which contains system information relating to each FA, based on the information stored in the PLD. The PLD includes a database and a look up table associated with prior events and current status for each FA, and also includes St_CDMA_Id_Num_Map_Data and St_CDMA_Ch_Config_BTS.

St_CDMA_Id_Num_Map_Data includes a frequency value for the each frequency assignment in the unit of MHz. St_CDMA_Ch_Config_BTS includes data corresponding to an attempt mode (or state) or an acknowledgement mode (or state) corresponding FA. The attempt mode of FA indicates an inactive state wherein the mobile station ignores the channel list message and thus not able to establish the communication link within a cell on a particular channel, and the acknowledgement mode indicates state wherein the mobile station accepts the channel message and thereby the communication link within a cell is established (or active) on a particular channel.

St_CDMA_Ch_Config_BTS also includes various types of channel number information for each frequency assignment. It contains information relating to the discreet location of various frequencies such as such as primary, second, and normal. In accordance with what type of channel data and the location of frequency on the channel list, it can be determined as to whether the operator is using which specific channel.

After determining the acknowledgement status of FA and the active status of each sector, the frequency value corresponding to that particular sector can be derived from the PLD. Then, a channel list can be generated to include the determined frequency value, and this generated channel list is transmitted to a mobile via normal paging channel element (PCE). Accordingly, the mobile station can now know the status of each sector and the FA using the channel list.

FIG. 3 shows an example illustrating the channel list showing the status of frequency assignment of each sector. As illustrated in FIG. 3, it is possible to understand that α sector (1), β sector (2) and γ sector (3) are all normal and 1FA and 2FA are allowed to be operated. The frequency value of the 1FA is 100 MHz and the frequency value of the 2FA is 200 MHz. The rest FAs are all set to 0 ('zero'), and the mobile station will interpret them as being out of service (OOS).

The mobile station, by receiving the channel list generated as stated above, can know the information regarding first two FAs in the corresponding area. Accordingly, the mobile station will perform a call attempt, and maintains the communication by selecting either one of the two FAs that are in service.

When a new FA is added, the BTS managing the current channel list generates another new channel list to reflect the newly added FA. FIG. 4 shows a flow chart illustrating a conventional method for generating a new channel list when a new FA is added. If a new FA is added (s110), the BTS generates a new PLD reflecting the new FA per each sector (s120). Then, referring to the PLD of the BTS, it is determined for which channel number of the new FA is established as either primary, secondary, or normal number by the operator of the system (s130). If the new FA is not assigned as one of primary, secondary, or normal, the process of initiating new FA is terminated, and generating of the new channel list is also terminated.

If the channel number for new FA in the new channel list is assigned as one of primary, secondary, or normal, it is determined as to whether an updated information of the channel list exists or not (s140). If the updated information of the channel list does not exist, a primary channel list is generated for all FAs in the acknowledgement mode, and then, this generated primary channel list is transmitted to mobile station via the corresponding paging channel (s150).

In the step s140, if the updated information of the channel list does exists, an updated channel is generated for all FAs in the acknowledgement state and this generated updated channel list is transmitted to the mobile station via the corresponding paging channel (s160). If the mobile station receives the primary channel list or the updated channel list, it is determined that the FA is normally operated according to the received channel list (s170).

The BTS updates the channel list by periodically confirming the state of sector/FA. FIG. 5 shows a flow chart illustrating conventional steps for confirming the state of sector/FA. As illustrated in FIG. 5, by periodically confirming the state of sector/FA (s210), it is checked to see whether the state of the corresponding sector/FA is active (s220) or the communication link is established through a channel. If it is active, the information of channel list for the active FA is updated (s230). If it is not active or the communication link is not established through a channel, the information of channel list for the inactive FA is updated (s240). At this time, after updating the channel list for the active FA or inactive FA in the steps, s230 and s240, it returns to the step s130.

It is required that the new FA is confirmed for whether the coverage serviceable through the new FA is balanced with other coverage serviceable through other FAs. A process including such a coverage balancing is called optimization of FA, for determining whether the new FA is acceptable with respect to its effect on nearby active calls.

As stated before, the mobile station in the prior art is provided with communication services even before any coverage optimization has been performed for the new FA. As a result, the prior art inadequately performs the optimization process which may cause an abnormal operation in the communication services.

Ideally, the operator of the mobile telecommunication system should perform the optimization process for the new FA during an idle state, when the least communication interference is achieved. This is done so that it is intended to prevent a subscriber from attempting a call to the newly assigned FA during the optimization process. However, frequently subscribers do try to attempt to complete a call during the idle state to the newly assigned FA, and consequently, it is not possible to correctly perform the optimization process due to the interference by other subscribers.

In summary, a problem exists in the prior known method because it has been not possible to perform optimization correctly before providing communication services via new FA.

SUMMARY OF THE INVENTION

To solve the problem associated with the conventional method, the present invention is intended to provide a method for performing optimization process when a new frequency assignment (FA) is added, wherein a base transceiver station (BTS) generates a channel list including only the new FA and a mobile station receives the channel list including only the new FA, so that the optimization process is completed without the interference from other subscribers trying to access the new FA.

The invention is also intended to provide a system including an operating mobile station assigned to connect a call through only the new FA and perform performing the optimization process for the new FA.

A preferable embodiment of the method according to the present invention includes a plurality base transceiver stations (BTS) and at least one handset for communicating on a plurality of channels by generating a channel list having the information about all serviceable FAs, the method comprising the steps of (a) adding a new FA and recording the information of each sector for the new FA to a program loaded data (PLD); (b) determining whether the new FA is in an acknowledgement mode, and if it is, generating a channel list accordingly to the conventional method, and if not, (c) determining whether the new FA is in an attempt mode, and if it is, determining which channel number is assigned to the new FA by BTS, otherwise, ending the process of initiating the determination; (d) generating a separate channel list for the corresponding FA that are in the acknowledgement mode in accordance with the assigned channel number; (f) performing optimization process to determine whether channel signal quality of said new FA is good or acceptable; and, (g) switching the attempt mode to the acknowledgement mode after the completion of the optimization process.

Other preferable embodiment of the method according to the present invention includes a mobile station for providing a mobile subscriber with communication services, and a BTS having at least one FA to provide the mobile station with communication services, wherein it is possible for the mobile station to receive the communication services via the FAs by generating a channel list having the information about all serviceable FAs including the newly added FA. Such method comprising the steps of: (a) adding a new FA to the present communication services to the mobile station by the BTS; (b) separately generating a first channel list having only information relating to the newly added FA; (c) optimizing the newly added FA using the first channel list by having the BTS to transmit the first channel list to the operating mobile station; (d) simultaneously generating a second channel list comprising the information of all FAs, which are presently serviceable by the BTS, including the newly added FA which has been optimized; and (f) providing communication service using the second channel list in such a way that the BTS transmits the second channel list to the mobile station.

Other preferable embodiment of the system according to the present invention includes: a base transceiver station (BTS) managing a first channel list and a second channel list, wherein the BTS has at least one FA(s) for providing communication services and wherein the first channel list only contains information relating to a new FA and the second channel list contains information of all serviceable FAs, except for the newly added FA; an operating mobile station being assigned to perform optimization process for the newly added FA; and, a mobile station receiving the second channel list from the BTS and being provided with communication services from the BTS through all FAs in the second channel list.

BRIEF DESCRIPTION OF THE DRAWINGS

FIG. 9 illustrates channel lists generated according to the present invention.

DESCRIPTION OF THE PREFERRED EMBODIMENTS

Figure 1:
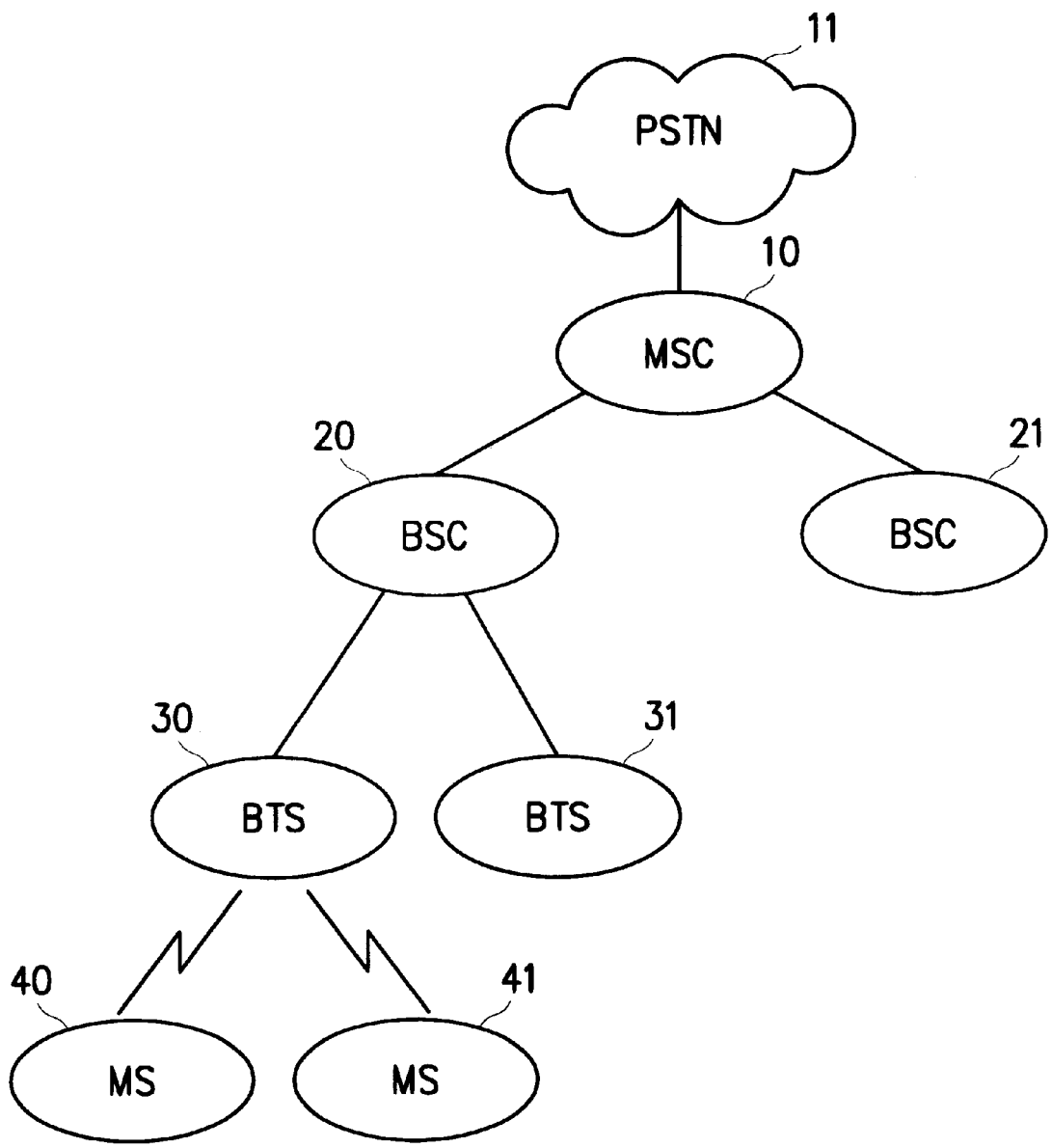
FIG. 1 shows a composition illustrating a conventional CDMA mobile telecommunication system.
Figures 2, 3:
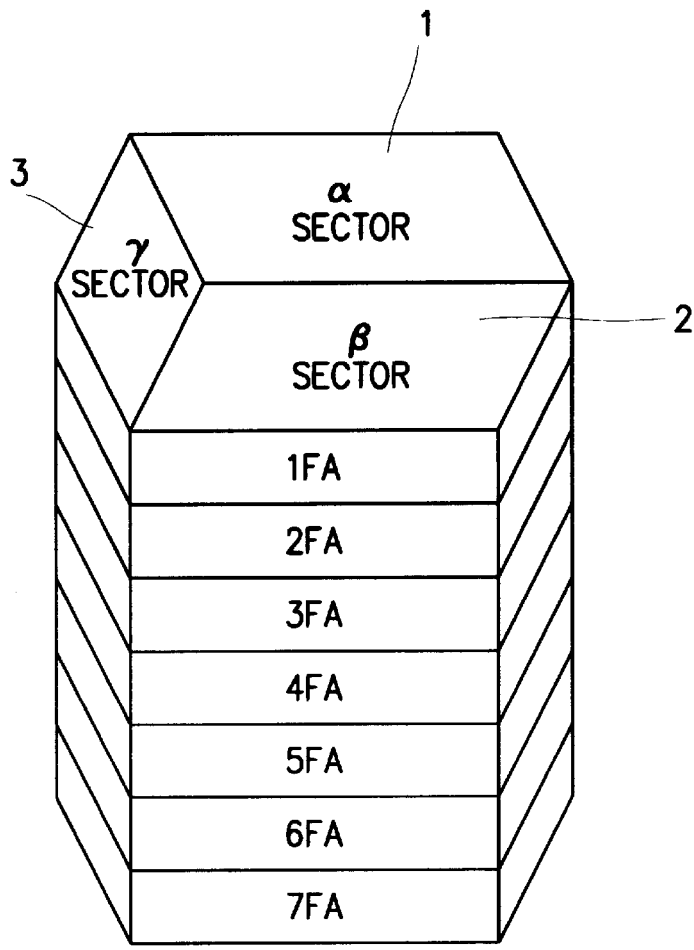
FIG. 2 illustrates a plurality of frequency assignments (FAs) that the BTS supports.
FIG. 3 shows an example illustrating the channel assignment list by each sector.

The description of how the base transceiver station (BTS) addes a new frequency assignment (FA) is explained as follow.

The BTS generates a channel list, which contains information relating to each FA, based on the information stored in the PLD. The PLD includes database which include a frequency value for each frequency assignment in the unit of MHz, and data corresponding to various types of an attempt mode and an acknowledgement mode for indicating the status of FA. The attempt mode of FA indicates when the communication within a cell is inactive or out of service on a particular channel, and the acknowledgement mode of FA indicates when the communication within a cell is active or in service on a particular channel. In other words, the attempt mode of FA indicates an inactive state wherein the mobile station ignores the channel list message and thus not able to establish the communication link within a cell on a particular channel, and the acknowledgement mode indicates state wherein the mobile station accepts the channel message and thereby the communication link within a cell is established (or active) on a particular channel.

Therefore, the present invention first determines whether the PLD is in attempt mode or acknowledgement mode. If it is determined that the PLD is in acknowledgement mode, the present invention uses a known conventional method to provide communication service as described the back ground section; and if not, the present invention further examines whether PLD is in attempt mode. If the PLD is not in attempt mode, the present invention terminates the checking process, and if not, it determines to see what type of channel number does the new FA corresponds to, and thereafter, a new channel list is generated for the new FA transmitted to an operating mobile station. Consequently, the operator of the base station can perform optimization only for the new FA without having the interference by other mobile stations trying to access the new FA. The optimization is a process for the cell to select a channel and monitor for whether a call transmitter is active within that cell on that channel. Thereafter, the attempt mode of the new FA is converted to the acknowledgement mode or in a service state, after the optimization process.

The present invention makes it possible for the new FA to be available apart from the previously existing FA during the optimization process. Therefore, a channel list for the previously existing FAs and new channel list for the new FA are generated separately. Then, the channel list for the existing FAs is transmitted to the general mobile station and the channel list for the new FA is transmitted to the specific mobile station. During this process of generating new channel lists, any calls from the general mobile station are not attempted through the newly added FA so that performance of the optimization of the new FA can be achieved more accurately, without having interference from other users who is trying to make a call through the new FA.

The channel list including the new FA is not transmitted to the general mobile station until the operating mobile station completes the optimization for the new FA.

Figure 6:
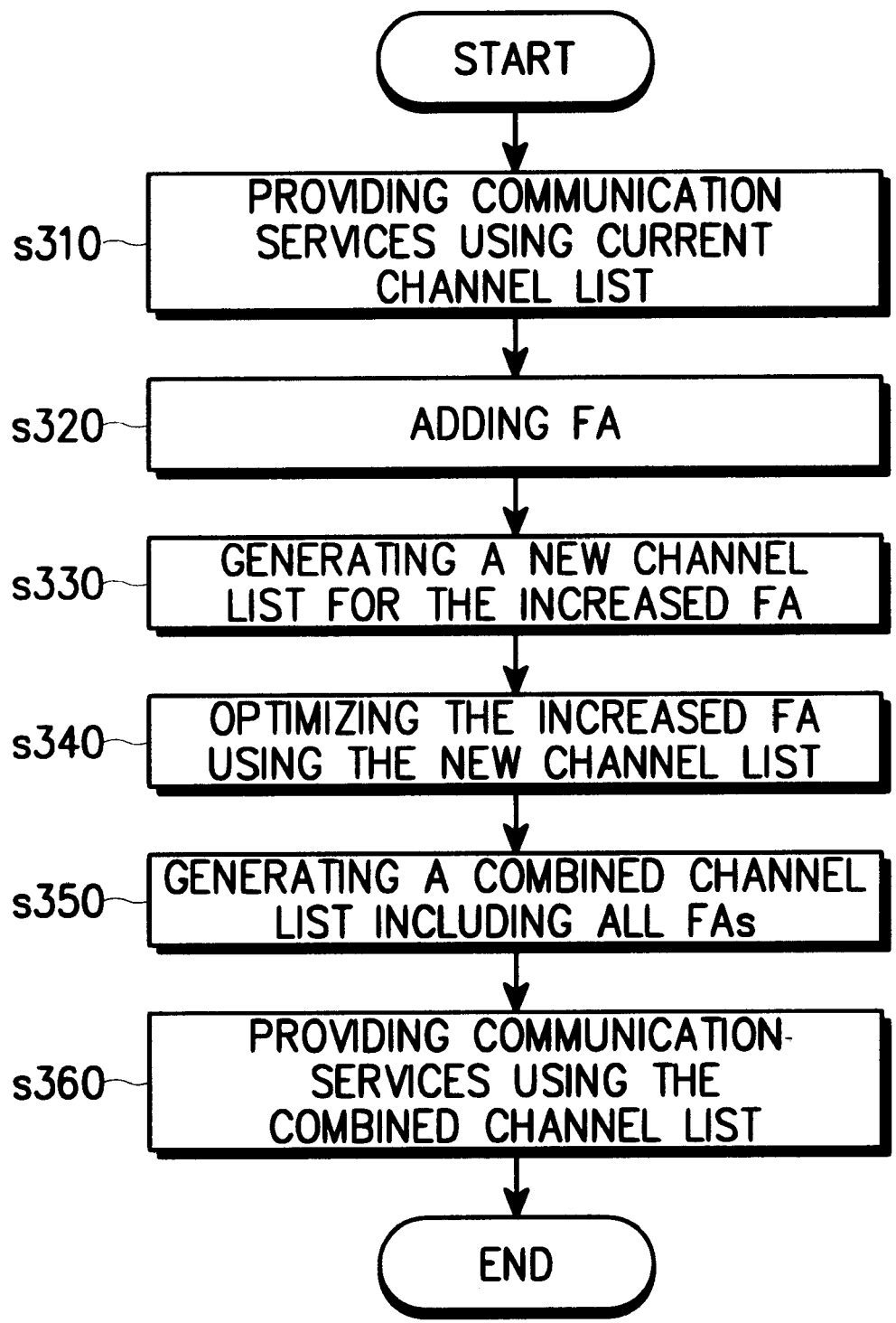
FIG. 6 shows a flow chart illustrating a method for increasing FA according to the present invention.

FIG. 6 shows a flow chart illustrating another embodiment of the present invetion for adding FA according to the present invention. As illustrated in FIG. 6, the method comprising the steps of: (a) adding a new FA to the present communication services to the mobile station by the BTS; (b) separately generating a new channel list having only information relating to the newly added FA; (c) optimizing the new FA using the first channel list by having the BTS to transmit the new channel list to the operating mobile station; (d) generating a combining channel list comprising the information of all FAs, which are presently serviceable by the BTS, including the new FA which has been optimized for whether a call transmitter is active; and (f) providing communication service using the combined channel list in such a way that the BTS transmits the combined channel list to the mobile station.

Figure 7:
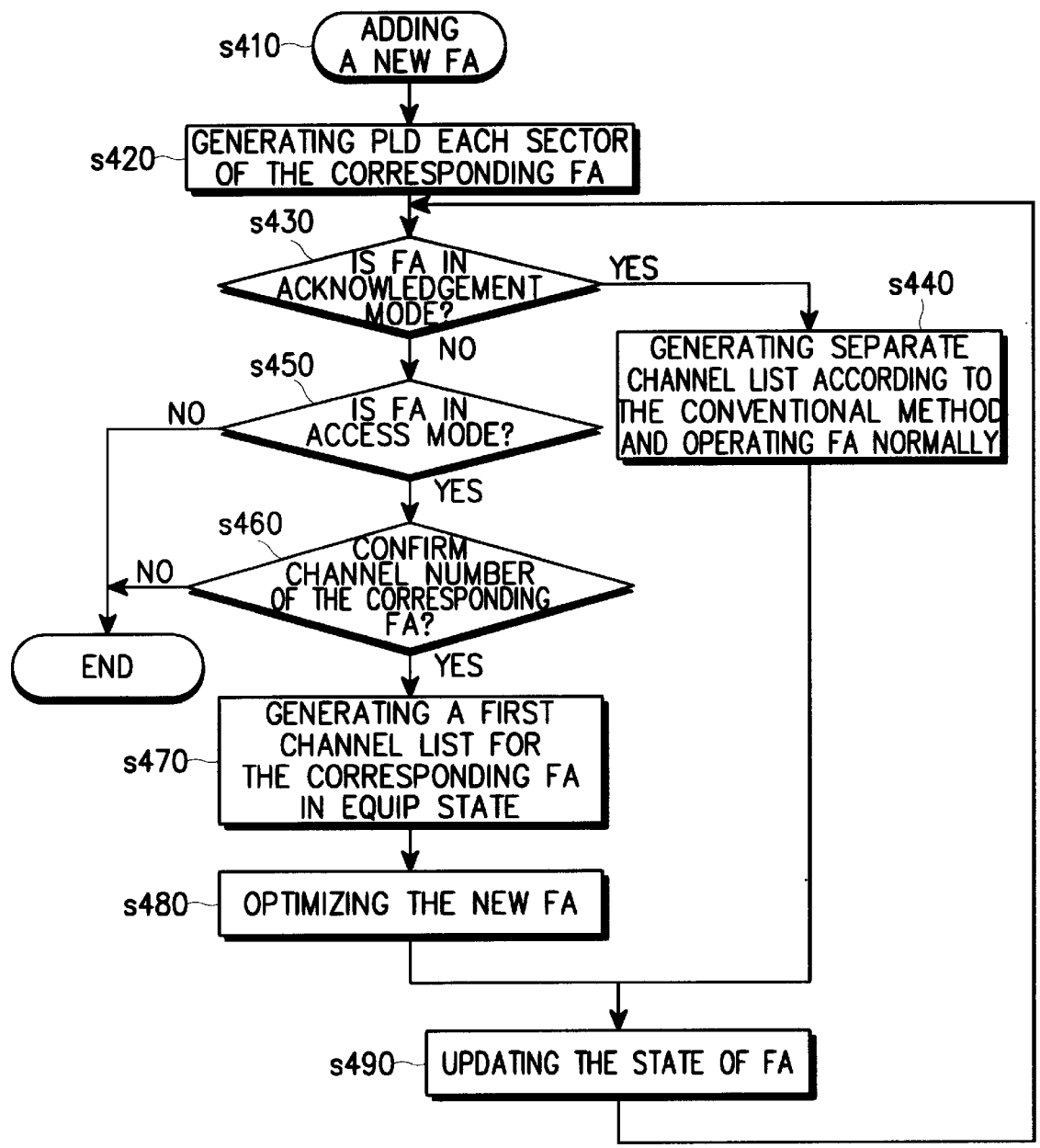
FIG. 7 shows a flow chart illustrating a method for generating the channel list according to the present invention.

FIG. 7 shows a flow chart illustrating a method for generating the channel list according to the present invention. Hereafter it will be described as to how the preferable embodiments according to the present invention work.

First, the BTS increase a new FA (s410) and records the status of the new FA to the St_CDMA_Ch_Config_BTS of PLD. Accordingly, various information for the corresponding FA are recorded to the appropriate location of the PLD, respectively (s420).

Figure 4:
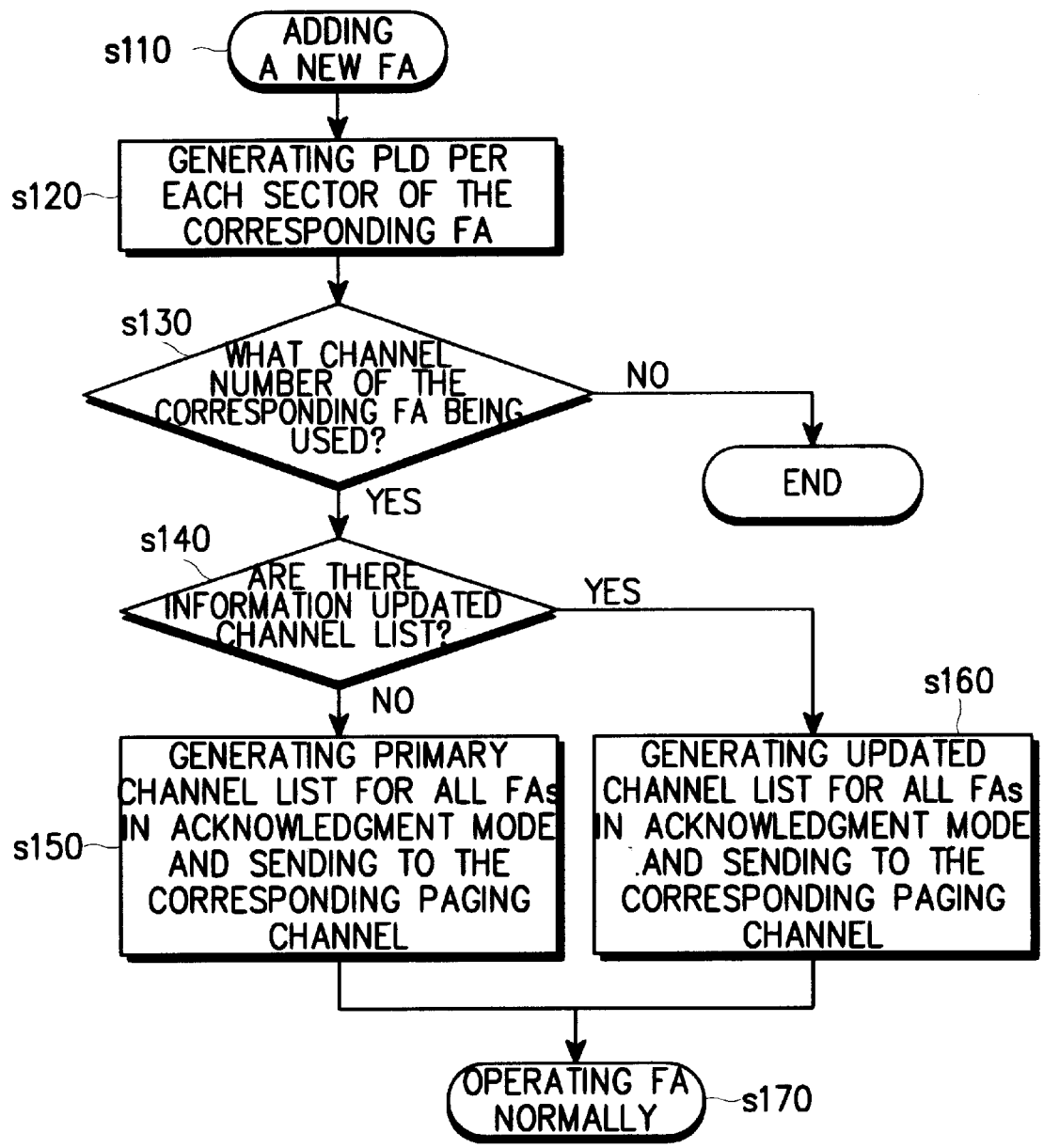
FIG. 4 shows a flow chart illustrating a conventional method for generating the channel list.
Figure 5:
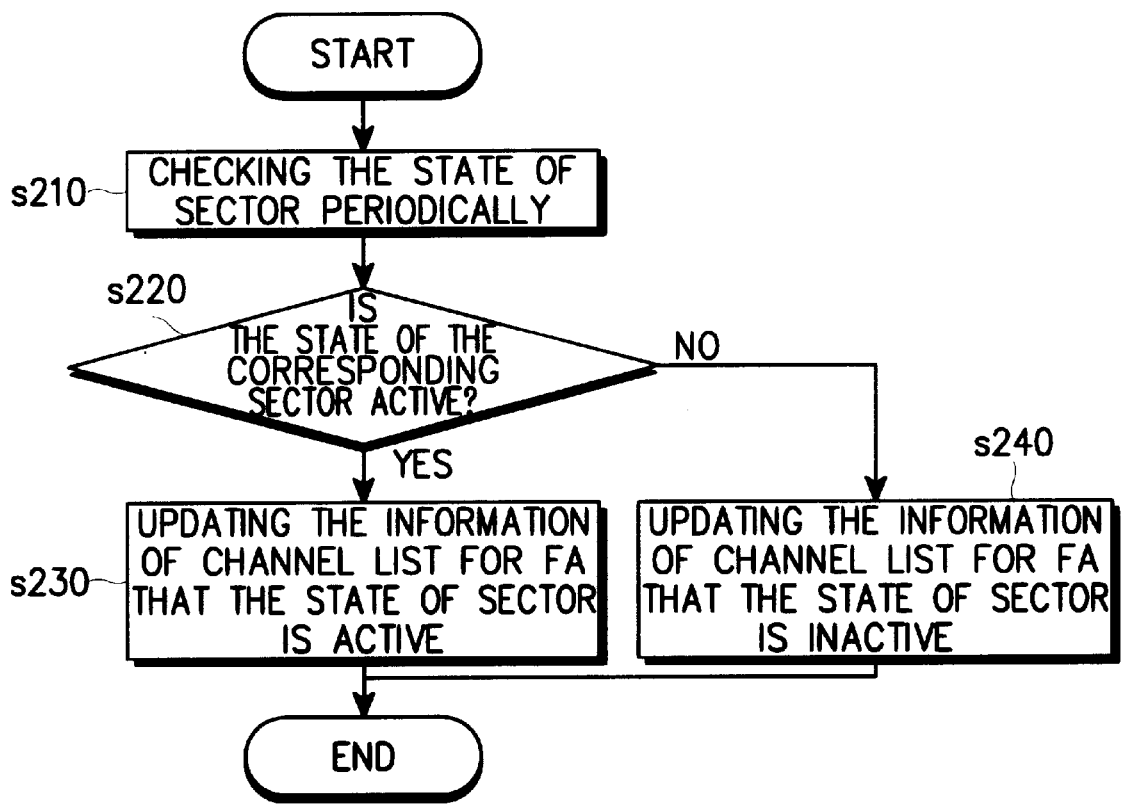
FIG. 5 shows a flow chart illustrating conventional steps for confirming the status of sector/frequency assignment.

As stated above, once the FA is added, it is determined whether the new FA is in an acknowledgement (s430). If the new FA is in the acknowledgement, a separate channel list is generated by using the conventional method as illustrated in FIG. 4 and FIG. 5 (s440).

If the PLD in response to the new FA is in the acknowledgement mode, it is determined for whether it is in an attempt mode (s450). If the PLD is not in the attempt mode, the method is terminated and the step of generating the channel list is also terminated. However, it is in the attempt mode, it is further determined for what channel number of the new FA is established, either primary (1FA), secondary (2FA), or normal (3FA through 7FA) (s460). If the channel number of the new FA is not to be used, the method is terminated and the step of generating the channel list is terminated.

If the channel number of the new FA is to be used, a first channel list is generated for containing only the new FA, and this first channel list is transmitted to an operating mobile station via paging channel (s470). Then, the operating mobile station is so provided with communication services through only the new FA, and the BTS performs optimization process for the new FA in relation to the operating mobile station.

At this time, the new FA is recorded to the location of primary FA (1FA) in the first channel list. Therefore, the operating mobile station recognizes the new FA as the primary FA (1FA).

At this time, the general mobile station receives a combined channel list from the BTS wherein the combined channel list includes all existing FAs being operated by the BTS. Therefore, the operating mobile station and the general mobile station maintain services having different channel lists, respectively.

For the purpose of maintaining services using different channel lists, respectively, the BTS updates the state of PLD for the new FA by changing the attempt mode to the acknowledgement mode after the optimization process has been performed. If the state of each FA is updated, the BTS returns to the step, s430, to determine again for whether the new FA is in the acknowledgement mode or not; and thereafter, performs the following steps s440 and s490 since the acknowledgement mode or in service (INS) state is determined after the optimization process. That is, the BTS generates a channel list including all FAs and the new added FA to transmit to the general mobile stations. Then, the general mobile station can be provided with communication services through all FAs, including the new FA. This process is accomplished in the steps, s440 and s490, which is the same process with those steps, s210 and s240, described in the related art.

Figure 8:
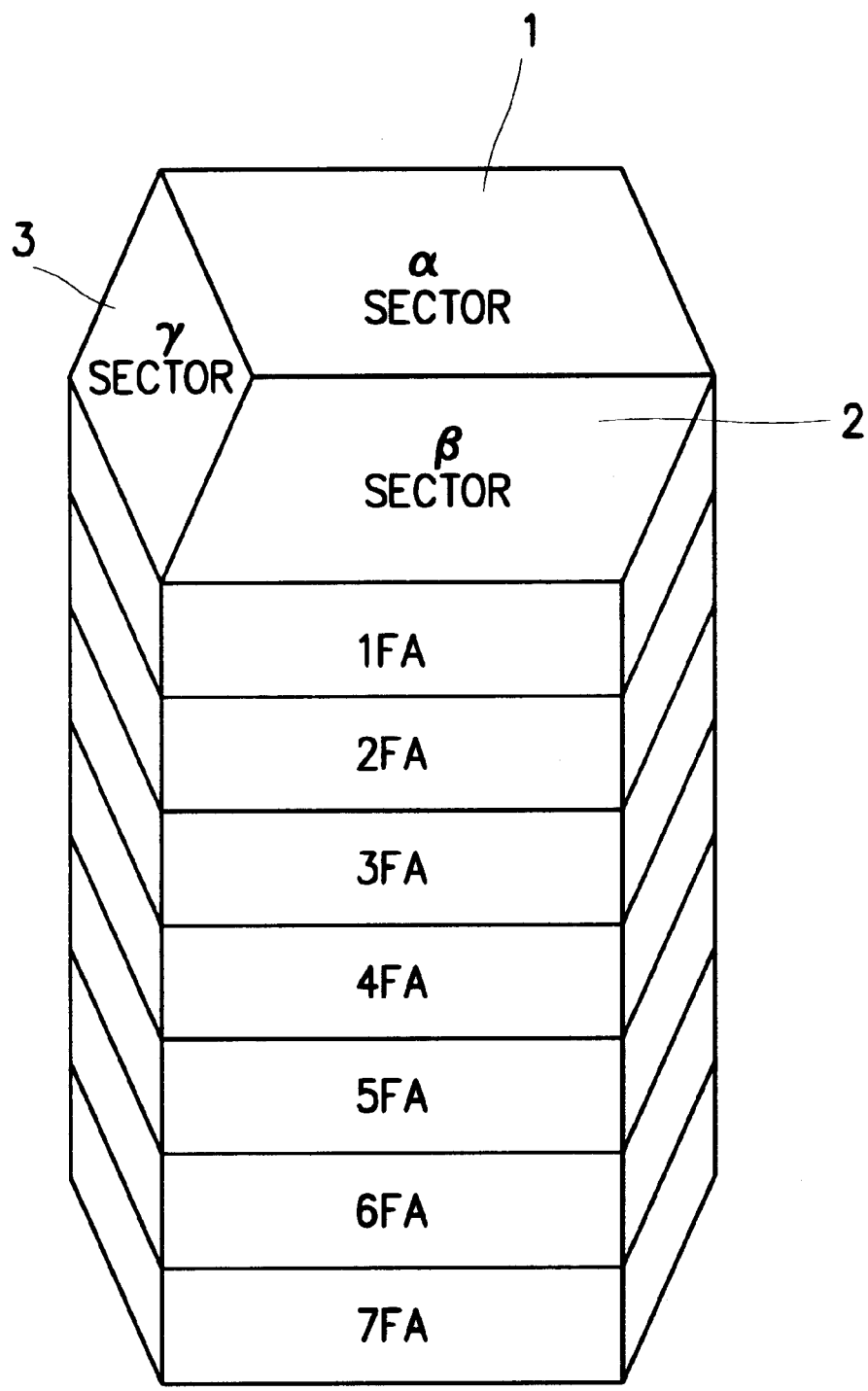
FIG. 8 illustrates a state where a new FA is being added in accordance with the present invention.

FIG. 8 illustrates values of FAs being assigned according to the present invention. As illustrated in FIG. 8, 1FA and 2FA are being used and 3FA is a newly added FA. Then, the existing channel list for the 1FA and 2FA is transmitted to the general mobile station, and a new channel list containing only the newly added 3FA is transmitted to the operating mobile station. The new channel list for the new FA records the new FA as primary frequency (1FA). The operating mobile station recognizes the new FA (3FA) as the primary frequency (1FA), and receives communication services from the BTS through the 3FA only. If the communication between the BTS and operating mobile station through the 3FA is acceptable or normally completed, the BTS determines that the 3FA is optimized, and thereafter includes the 3FA in the combined channel list being transmitted to the general mobile stations. Now, the general mobile stations can not only use the existing 1FA and 2FA but also the newly assigned 3FA. Since the 3FA is optimized by the operating mobile station, it is now possible to use the 3FA more reliably, in comparison to the prior known art wherein the optimization process couldn't be completed without interruptions from other general mobile stations trying to access the new FA.

FIG. 9 illustrates two channel lists generated according to the present invention. As illustrated in FIG. 9, a first channel list (a) is received in the general mobile station and second channel list (b) is received in the operating mobile station. In the first channel list (a), each sector is established to recognize 100 Mhz as a primary frequency, 1FA. Accordingly, the general mobile station recognizes a frequency value of 100 MHz as the primary frequency so that the general mobile stations processes only the first channel list (a). Therefore, the general mobile station does regard it as an error when it receives the second channel list (b) for the new FA, which does not have 100 MHz as a primary frequency.

Since the operating mobile station according to the present invention is established to recognize 300 MHz as primary frequency, wherein the frequency value of the 3FA is 300 MHz, the operating mobile station regards the first channel list (a) as an error. Thus, the operating mobile station only receives and processes the second channel list (b) for the new FA. Accordingly, the operating mobile performs a call attempt and maintains the communication through the frequency value (300 MHz) of the new FA, and thereafter the BTS performs optimization by confirming whether it is possible to provide services normally through the new FA using the operating mobile station.

As shown in the above, the present invention increases a FA in such a way that it generates a new channel list for the new FA, and only the operating mobile station can be provided with services for the new FA and further performs the optimization process. After the optimization is completed, the attempt mode converts to the acknowledgement mode, and the combined channel list including the new FA is generated and provided to general subscribers in accordance with known prior art. The present invention provides method of process for generating two channel lists, one for the new FA and the other for previous existing FAs, so that the operator of BTS has time to perform optimization indepenently and accurately for the new FA, without worrying about any interference from the subscribers attempting to access the new FA during the optimization process. This is achieved by adding extra steps to the known prior art of generating channel list. The extra steps include distinguishing the attempt mode and acknowledgement mode, and generating a new channel list for the newly added FA. By taking these extra steps, the problems associated with performing optimization that existed in the prior art is solved.

While the invention is susceptible to various modification and alternative forms, specific embodiments thereof have been shown by way of example in the drawings and will be herein be described in detail. It should be understood, however, that it is not intended to limit the invention to the particular forms disclosed, but on the contrary, the intention is to cover all modification, equivalents, and alternatives falling within the spirit and scope of the invention as defined by the appended claims.

What is claimed is:

1. A method for adding a new frequency assignment (FA) in a cellular communication system of the type having a plurality of cells with each cell containing a plurality of sectors and each sector having a group of frequencies assigned to it that is the same as the group of frequencies assigned to other sectors within that same cell, a plurality of base stations each generating a channel list having a plurality of identifiable location for various frequencies, and a least one mobile station for communicating with at least one of said base stations on a channel frequency selected from said channel list for said one base station, wherein a current channel list is based on program loaded data (PLD) containing system configuration information such as the current channel quality, current channel frequency assignments (FAs), and the number of unassigned channels, said method comprising the steps of:

(a) transmitting communication signals between said one of said base stations and said at least one mobile station via a frequency selected from said current channel list;

(b) receiving a request for a new FA at said one of said base stations from said at least one mobile station;

(c) generating a new channel list identifying only said new FA; and, (d) generating a combined channel list including information from both said current channel list and said new channel list, for transmitting communication signals between said one of said base stations and said at least one mobile station through a frequency selected from said combined channel list.

2. The method as set forth in claim 1, wherein generating said new channel list further comprises steps of:

(e) compiling and storing said program loaded data (PLD) based upon said new FA, wherein said PLD having a first message identifying when said PLD is in an access attempt mode which indicates that said at least one mobile station is not communicating with said one of said base stations via said new FA, and a second message identifying when said PLD is in an acknowledgement mode which indicates that said at least one mobile station is communicating with said one of said base stations via said new FA;

(f) determining whether said PLD is in said acknowledgement mode in response to said new FA;

(g) generating a separate channel list and adding said new FA to said separate channel list when said PLD is in said acknowledgement mode;

(h) determining whether said PLD is in said access attempt mode when said PLD is not in said acknowledgement mode;

(i) determining the location of channel frequency for said new FA to be assigned in said new channel list when said PLD is in said access attempt mode;

(j) generating said new channel list containing only said new FA in accordance with said determined location of channel frequency;

(k) optimizing whether channel signal quality of said new FA selected from said new channel list is acceptable;

(l) updating said PLD by switching said access attempt mode to said acknowledgement mode following completion of said step (k); and, (m) repeating said step (f) and said step (g) following completion of said step (l).

3. The method as set forth in claim 2, wherein the process initiated in claim 2 is terminated when said PLD is not in said attempt mode.

4. The method as set forth in claim 2, wherein the channel frequency assigned to each of said current channel list, said new channel list, and said separate channel list are transmitted via a paging channel between said one of said base stations and said at least one mobile station.

5. The method as set forth in claim 2, wherein the location of channel frequency for said new FA in said step (i) is set up to a first location in said new channel list.

6. The method as set forth in claim 2, wherein the process initiated in claim 2 is terminated when the location for said new FA in said step (i) is not assigned.

7. Method as in claim 2, wherein generating said separate list in said step (g) further comprising the steps of:

determining the location of channel frequency for said new FA to be assigned in said separate channel list when said PLD is in said acknowledgement mode;

determining whether said separate channel list is updated to include said new FA when said PLD is in said acknowledgement mode;

generating a primary channel list to include all FAs when the updated information on said separate channel list does not exist; and, generating an updated separate channel list to include all FAs when the updated information on said separate channel list exists.

8. The method as set forth in claim 7, wherein the process initiated in claim 7 is terminated when the location of channel frequency for said new FA is not assigned.

9. The method as set forth in claim 7, wherein the channel frequency assigned to said primary channel list and said updated channel list are transmitted via a paging channel between said one of said base stations and said at least one mobile station.

10. The method as set forth in claim 9, wherein the process initiated in claim 7 is determined to be completed when said at least mobile station receives either said primary channel list or said updated channel list via said paging channel from said one of base stations.

11. Method as in claim 2 or 7, wherein generating said separate list in said step (g) further comprises the steps of:

periodically checking said PLD to determine whether the channel signal quality of a frequency in said each sector is acceptable;

updating the separate channel list when the channel signal quality of the frequency in said each sector is acceptable; and, updating the separate channel list when the channel signal quality of the frequency in said each sector is not acceptable.

12. A method for adding a new frequency assignment (FA) in a cellular communication system of the type having a plurality of cells with each cell containing a plurality of sectors and each sector having a group of frequencies assigned to it that is the same as the group of frequencies assigned to other sectors within that same cell, a plurality of base stations each generating a channel list having a plurality of identifiable location for various frequencies, and a least one mobile station for communicating with at least one of said base stations on a channel frequency selected from said channel list for said one base station, wherein a current channel list is based on program loaded data (PLD) containing system configuration information such as the current channel quality, current channel frequency assignments (FAs), and the number of unassigned channels, said method comprising the steps of:

(a) transmitting communication signals between said one of said base stations and said at least one mobile station via a frequency selected from said current channel list;

(b) receiving a request for a new FA at said one of said base stations from said at least one mobile station;

(c) generating a new channel list identifying only said new FA;

(d) optimizing whether channel signal quality of said new FA selected from said new channel is acceptable; and, (e) generating a combined channel list including information from both said current channel list and said new channel list, for transmitting communication signals between said one of base stations and said at least one mobile station through a frequency selected from said combined channel list.

13. The method as set forth in claim 12, updating said PLD by switching said access attempt mode to said acknowledgement mode when the channel signal quality of said new FA selected from said new channel list is acceptable.

14. The method as set forth in claim 12, wherein the location of channel frequency for said new FA is set to a first location of said new channel list.

15. The method as set forth in claim 12, wherein the channel frequency assigned to each of said current channel list, said new channel list, and said combined channel list are transmitted via a paging channel between said one of base stations and said at least one mobile station.

* * * * *